United States Patent [19]

Mickus et al.

[11] 4,382,966

[45] May 10, 1983

[54] ANIMAL FEED SUSPENSION AND METHOD OF MAKING THE SAME

[75] Inventors: James C. Mickus, Bloomington; Robert L. Hesse, Minneapolis, both of Minn.; Gary L. Pruitt, Mount Zion, Ill.

[73] Assignee: Cargill Incorporated, Minneapolis, Minn.

[21] Appl. No.: 205,920

[22] Filed: Nov. 12, 1980

[51] Int. Cl.³ .......................... A23K 1/22; A23K 1/18
[52] U.S. Cl. .................................... 426/69; 426/74; 426/573; 426/648; 426/658; 426/807
[58] Field of Search ................... 426/69, 74, 635, 658, 426/807, 573, 648

[56] References Cited

U.S. PATENT DOCUMENTS 3,895,117  7/1975  Backlund ........................... 426/658
4,267,197  5/1981  Sawhill .............................. 426/658

OTHER PUBLICATIONS

Technical Bulletin of Kelco, a Division of Merck & Co., Inc., re Kelflo (xantham gum) suspends limestone in liquid feed supplements.

An article (36 pp.) re Keltrol and Kelzan (trademarks of Kelco) xanthan gum, dated 12/78.

*Primary Examiner*—Raymond N. Jones
*Assistant Examiner*—George C. Yeung
*Attorney, Agent, or Firm*—Fitch, Even, Tabin, Flannery & Welsh

[57] ABSTRACT

A new animal feed suspension including method for its preparation, where xanthan gum stabilizes the suspension such that an excess of 20% by weight insoluble nutrients are held suspended therein.

15 Claims, No Drawings

ANIMAL FEED SUSPENSION AND METHOD OF MAKING THE SAME

This invention relates generally to animal feed suspensions. More particularly, the invention relates to a method for effecting high loading of macro minerals into a stable liquid suspension to be used as an animal liquid feed supplement.

Properly prepared feed suspensions or supplements for livestock such as beef and dairy cattle, include macro and micro minerals as a part of their composition. Among the macro minerals of nutritional importance are calcium and magnesium. The most common and least expensive source of calcium is limestone which is principally calcium carbonate. Limestone, however, settles out of liquid feed supplements quickly, usually within 24 hours after mixing. Transporting a supplement accelerates the settling process. Agitation of a stored liquid feed suspension which has settled is difficult and often ineffective. As a result, livestock often do not receive adequate calcium, or such an amount which was intended to be fed to them.

Attapulgite clay has been used as a suspension aid for macro minerals in liquid animal feed supplements. Such suspensions are not stable or thixotropoic, and the macro minerals such as limestone readily settle from the suspension.

Xanthan gum has been used in animal liquid feed supplements to increase the viscosity of the supplements such that low concentrations of insolubles containing minerals of nutritional value do not settle from the liquid. In the past, these xanthan gum containing liquids have increased stability to inhibit settling, but do not have the ability to retain high weight percentages of insoluble nutrients in suspension.

A need exists, therefore, for an animal feed suspension which will not settle over extended periods of storage or during transportation and which will also permit high loading of insoluble mineral nutrients into the suspension. The present invention provides such a thixotropic suspension and method for obtaining same.

According to the invention, xantham gum is hydrated in an aqueous medium, such as water, corn steep liquor or whey and urea liquor to obtain a thixotropic gel having an infinite viscosity at rest and a viscosity of between about 1,000 to about 10,000 centipoises at a shear rate of one reciprocal second depending upon the amount of xanthan gun used. Upon hydration of the gum, as aforesaid, soluble monovalent and polyvalent salts then are added to the hydrated gum solution. Carbohydrate nutrients, such as molasses, lignin liquors and hemi-cellulose extracts, are added. Nutrients containing nitrogen and phosphorus such as ammonium polyphosphate are added. Insoluble nutrients primarily comprising calcium carbonate are then added wherein the insoluble nutrients have a particle size of between about 200 mesh or greater. The calcium carbonate provides about 20% or greater by weight of the suspension with loading of the $CaCO_3$ into the suspension being capable until it settles from the suspension with about 40 percent by weight calcium carbonate being attainable. Unless otherwise specified all percentages hereafter mentioned are by weight. After the additions, the pH of the suspension is adjusted to 5.8 to 9.0 with phosphoric acid, sulfuric acid, feed grade caustic, or aqua ammonia as the need may be. The preferred pH is about 6.2 with a pH in the range of 9.0 or above creating an ammonia odor which is not desirable for animals. The sequence of addition of the ingredients and adjustment of the pH are important to achieve the heavy loading of the calcium carbonate in the animal feed supplement. It should also be noted that after the addition of the insolubles, flavors, drugs, or vitamins, if any, may be added.

After hydration addition of the carbohydrate nutrients, mono and polyvalent salts and phosphorous and nitrogen containing nutrients are optional depending upon the desired final composition of the feed suspension.

In the preferred method for preparing the suspension which is the subject of the present invention, 207 pounds of 55% urea liquor is mixed with 210 pounds of water. One pound of xanthan gum is added to the water-urea mixture in such a manner to assure complete dispersion and hydration of the gum. Although as greater amounts of xantham gum may be used practical and economic limitations indicate a gum mixture having gum in the range of about 0.20 to about 2.0 percent by weight with the preferred range being about 1.0 to about 1.5 percent by weight of the suspension. Eductor addition is prefered, but the xanthan gum can be slowly and continuously added over the top of a Bard-type mixer, or other means may be used. About 5 minutes or more, with mixing, should be allowed for hydration of the xanthan gum before further additions to the gum mixture. Upon hydration of the gum, the mixture had a viscosity of 700 centipoises. A suspension with 0.50 percent xantham gum would have a viscosity of about 1000 centipoises and a 2 percent xantham gum suspension has a viscosity of about 10,000 centipoises.

After addition and hydration of the gum, 46 pounds of sodium chloride is mixed into the water-urea-gum mixture. After allowing approximately five minutes for dissolution of the sodium chloride, 215 pounds of 79.5 Brix beet molasses is added to the mixture and mixed therein, although other salts and carbohydrate nutrients may be used.

After the addition of molasses, 104 pounds of ammonium polyphosphate solution (10-34-0) is added to the mixture. The ammonium polyphosphate may be liquid or dry, when dry the addition may require increased mixing to dissolve the ammonium polyphosphate of appropriate particle size. 217 pounds of 200 mesh (or smaller particle size) calcium carbonate is then added and mixed into the liquid. The pH of the suspension is adjusted to between about 5.8 and 6.4. The resulting stable liquid suspension has the following composition:

| Ingredient | Weight Percent |
| --- | --- |
| Water | 21.0 |
| 55% urea liquor | 20.7 |
| Xanthan gum | 0.1 |
| Sodium chloride | 4.6 |
| 79.5 Brix beet molasses | 21.5 |
| Ammonium polyphosphate aqueous solution (10-34-0) | 10.4 |
| $CaCo_3$ | 21.7 |

The exact amounts of the example are illustrative of the above formulation. The amounts may, of course, be increased or decreased depending on the amount of suspension that is desired. Further, high shear processing equipment may be used for dispersing and hydrating of the gum, and mixing and suspending the solids. This is preferred because it facilitates continuous process and reduces the amount of time for preparation of the suspension.

Although the above formulation has 21.7% by weight of calcium carbonate, the formulation can be adjusted to contain higher levels of calcium carbonate. Further, other insoluble mineral nutrients such as magnesium oxide, and mono or di-calcium phosphate may be used with the calcium carbonate.

Other monovalent salt such as potassium chloride may be used instead of or mixed with sodium chloride. Suitable soluble polyvalent salts such as $CaCl_2$, $MgCl_2$, $MgSO_4$, or others as are known in the art may be added to the hydrated water-gum mixture. As with the addition of the monovalent salts, time should be allowed for the desired dissolution of the salts.

In lieu of hydrating the xanthan gum in water, the gum may be hydrated in corn steep liquor, urea liquor, or whey. Lignin liquors and hemi cellulose extracts may be used as nutritive ingredients in addition to or as a replacement for molasses.

The invention makes possible liquid animal feed supplements with unusually high loading of macro particles of insoluble ingredients. The prior methods have not made such high loading possible in suspensions at rest in storage or in transport. While it is not fully understood how the invention makes possible the high loading, it has been found that the order of addition of the materials and adjustment of the pH are important aspects of the invention.

The various features of the invention which are believed to be new are set forth in the following claims:

What is claimed is:

1. A method for the manufacture of a stable liquid animal feed suspension with high loading of macro minerals therein said method comprising:
   dispersing and hydrating xantham gum in an aqueous medium selected from the group consisting of water, corn steep liquor, urea, whey, or mixtures thereof forming a xanthan gum mixture;
   mixing into said xanthan gum mixture water soluble salts, nutritive ingredients and calcium carbonate forming a uniformly dispersed calcium carbonate suspension, said calcium carbonate having a size of about 200 mesh or smaller, said calcium carbonate comprising at least about 20 percent by weight of said suspension; and
   adjusting the pH of said suspension to between about 5.8 and about 9.0.

2. A method as recited in claim 1 wherein said nutritive ingredients are selected from the group consisting of molasses, lignin liquors, hemicellulose extracts or mixtures thereof; and wherein water and urea liquor are mixed and xanthan gum is added to said water and urea mixture, and said calcium carbonate comprises from about 20 percent by weight to about 40 percent by weight of said suspension.

3. A method as recited in claim 1 wherein said xanthan gum is dispersed in a water and urea mixture by eductor addition.

4. A method as recited in claim 2 wherein xanthan gum comprises from about 0.2 to about 2.0 percent by weight of said calcium carbonate suspension, and wherein molasses is said nutritive ingredient and ammonium polyphosphate is added to said xanthan gum mixture.

5. A method in accordance with claim 1 wherein said dispersing and hydrating xanthan gum is in a medium which includes molasses.

6. A method for making a stable animal feed suspension with high loading of macro minerals therein said method comprising:
   dispersing xanthan gum in an aqueous medium selected from the group consisting of water, corn steep liquor, urea, whey or mixtures thereof forming a hydrated xanthan gum mixture;
   dissolving water soluble salts into said xanthan gum mixture forming a hydrated gum solution;
   blending nutritive ingredients into said hydrated gum solution, said nutritive ingredients selected from the group consisting of molasses, lignin liquors, hemi-cellulose extracts or mixtures thereof forming a hydrated nutritive mixture thereof;
   suspending calcium carbonate having a size of about 200 mesh or smaller into said hydrated nutritive mixture forming a calcium carbonate suspension, said calcium carbonate comprising at least about 20 percent by weight of said calcium carbonate suspension; and
   adjusting the pH of said suspension to between about 5.8 to about 9.0.

7. A method as recited in claims 1, 2, 5 or 6 wherein said water soluble salts comprise NaCl, KCl, $CaCl_2$, $MgCl_2$ and $MgSO_4$.

8. A stable animal feed suspension made in accordance with the process comprising:
   dispersing xanthan gum in an aqueous medium selected from the group consisting of water, corn steep liquor, urea, whey or mixtures thereof forming a hydrated xanthan gum mixture;
   mixing into said hydrated xanthan gum mixture water soluble salts, nutritive ingredients and calcium carbonate forming a uniformly dispersed calcium carbonate suspension, said calcium carbonate having a size of about 200 mesh or smaller, said calcium carbonate comprising at least about 20 percent by weight of said calcium carbonate suspension;
   and adjusting the pH of said suspension to between about 5.8 to about 9.0.

9. A stable animal feed suspension as recited in claim 8 wherein said nutritive ingredients are selected from the group consisting of molasses, lignin liquors, hemi-cellulose extracts or mixtures thereof.

10. A stable animal feed suspension as recited in claim 8 wherein said xanthan gum is dispersed in a water and urea mixture.

11. A stable animal feed suspension as recited in claims 8 or 9 wherein xanthan gum comprises from about 0.2 to about 2.0 percent by weight of said calcium carbonate suspension and ammonium polyphosphate is mixed into said hydrated xanthan gum mixture.

12. A stable animal feed suspension as recited in claim 10 where in said xanthan gum is dispersed and hydrated in a medium which includes molasses.

13. A stable animal feed suspension made in accordance with the process comprising:
   dispersing xanthan gum in an aqueous medium selected from the group consisting of water, corn steep liquor, urea, whey or mixtures thereof forming a hydrated xanthan gum mixture;
   blending nutritive ingredients into said hydrated gum mixture, said nutritive ingredients selected from the group consisting of molasses, lignin liquors, hemi-cellulose extracts or mixtures thereof forming a hydrated nutritive mixture;
   dissolving water soluble salts and suspending calcium carbonate having a size of about 200 mesh or smaller into said hydrated nutritive mixture forming a calcium carbonate suspension, said calcium carbonate comprising at least about 20 percent by weight of said calcium cabonate suspension; and adjusting the pH of said suspension to between about 5.8 to about 9.0.

14. A stable animal feed suspension as recited in claims 8, 9, 10, 12 or 13 wherein said water soluble salts comprise NaCl, CaCl$_2$, MgCl$_2$ and MgSO$_4$.

15. A stable animal feed suspension as recited in claim 14 wherein said calcium carbonate comprises from about 20 percent by weight to about 40 percent by weight of said suspension.

* * * * *

UNITED STATES PATENT AND TRADEMARK OFFICE
CERTIFICATE OF CORRECTION

PATENT NO. : 4,382,966
DATED : May 10, 1983
INVENTOR(S) : James C. Mickus et al.

It is certified that error appears in the above-identified patent and that said Letters Patent is hereby corrected as shown below:

Column 1, line 20, "has" should read --have--.

Column 1, line 49, "gun" should ream --gum--.

Column 2, line 18, "xantham" should read --xanthan--.

Column 2, line 30, "xantham" should read --xanthan--.

Column 2, line 31, "xantham" should read --xanthan--.

Column 3, line 36, "xantham" should read --xanthan--.

Column 3, line 51, "hemicellulose" should read --hemi-cellulose--.

Signed and Sealed this

Thirtieth Day of April 1985

[SEAL]

Attest:

DONALD J. QUIGG

Attesting Officer     Acting Commissioner of Patents and Trademarks